United States Patent

[11] 3,628,942

[72] Inventor Joseph F. Vartiak
 Naperville, Ill.
[21] Appl. No. 418,343
[22] Filed Dec. 14, 1964
[45] Patented Dec. 21, 1971
[73] Assignee Nalco Chemical Company
 Chicago, Ill.
 The portion of the term of the patent subsequent to Aug. 26, 1986, has been disclaimed.

[54] HERBICIDALLY ACTIVE COMPOSITIONS
 3 Claims, No Drawings
[52] U.S. Cl. .................................................. 71/92,
  71/93, 71/109, 71/110, 71/122, 71/DIG. 1
[51] Int. Cl. ............................................. A01n 9/22
[50] Field of Search .......................................... 71/2.5,
  DIG. 1, 92

[56] References Cited
 UNITED STATES PATENTS
3,235,357 2/1966 Loux ........................... 71/2.5

Primary Examiner—James O. Thomas, Jr.
Attorney—Marzall, Johnston, Root, O'Keeffe, Keil, Thompson & Shurtleff ABSTRACT: The invention is directed to concentrated hydrocarbon liquid solutions of herbicidally active 3,5,6-substituted uracils. These compositions are afforded by employing hydrocarbon oil which has a high aromatic content and uses as a cosolvent a fatty acid. This solvent system allows 5–20 percent by weight of the uracil to be dissolved therein.

HERBICIDALLY ACTIVE COMPOSITIONS

This invention relates to stable, relatively concentrated herbicidal liquids which contain as their active ingredient herbicidally active 3,5,6-substituted uracils. Specifically, the invention is directed to compositions of the above type which contain phytotoxic aromatic hydrocarbon oils and other known herbicides thereby providing herbicidally active unitary compositions capable of controlling vegetation when applied to the situs upon which said vegetation grows. This treatment allows such vegetation to be controlled at low economic doses and in relatively short periods of time after application of the compositions.

It has been recently discovered that certain 3,5,6-substituted uracils possess a high degree of herbicidal activity. These chemicals are crystalline so solids which have only a slight solubility in liquids commonly used as carriers for applying herbicidally active chemicals. For instance, carriers as water and inexpensive organic materials such as aliphatic petroleum solvents will dissolve only minute amounts of the herbicidally active uracils. To the present, it has been necessary to apply the herbicidally active 3,5,6-substituted uracils in the form of dust or granules or as so called wettable powder formulations. Such products are troublesome to prepare and difficult to apply at uniform rates. They are far inferior to true liquid formulations from a standpoint of applying these products to large areas such as are encountered in the treatment of railroad right-of-ways.

Another disadvantage that has been encountered in the use of herbicidally active 3,5,6-substituted uracils is that these products are relatively slow in their initial destructive effect to undesirable vegetation. In many areas of weed control it is not only beneficial but necessary that good control be achieved within a very short period of time after application. Thus, if it were possible to provide a formulation containing herbicidally active 3,5,6-substituted uracils which was a readily applied liquid and which would have immediate effect in the control of weeds, it would be a valuable contribution to the weed control art.

Another disadvantage sometimes encountered when using the herbicidally active 3,5,6-substituted uracils is that certain select species are not eradicated or controlled by these materials. When such situations occur, it would be helpful if it were possible to combine with the herbicidally active 3,5,6-substituted uracils other known herbicidally active chemicals which would tend to control these species. It, therefore, is an object of the invention to provide liquid herbicide formulations which contain herbicidally active 3,5,6-substituted uracils to allow relatively complete control of a wide number of undesirable plant species.

A further object of the invention is to provide herbicidal compositions containing herbicidally active 3,5,6-substituted uracils either alone or in combination with other herbicidally active chemicals to provide quick acting herbicidally active products.

A still further object is to provide multicomponent hydrocarbon liquid compositions containing substituted uracils, the contents of which may be tailored according to the type of plant desired to be controlled. It is intended that such materials be suitable for spraying operations in whatever amounts are required for the desired extent of plant growth control, such as in controlling weed problems found on or near roadsides, railroad rights-of-way, industrial sites, and areas adjacent to cultivated land. Other objects will appear hereinafter.

In accordance with the invention, a quick acting liquid herbicidal composition comprising a herbicidally active 3,5,6-substituted uracil has been discovered. The heretofore hydrocarbon-insoluble uracil is dissolved in a hydrocarbon oil, having an aromatic content calculated as at least 60 percent, by cooperative action of a fatty acid cosolvent. The fatty acid cosolvent acts as a coupling agent to unite the herbicidally active 3,5,6-substituted uracil with the phytotoxic hydrocarbon oil. In a specific embodiment of the invention the uracil herbicide is combined in liquid form with one or more additional herbicides other than the herbicidally active uracil material.

The compositions of the invention may be prepared in a variety of ways. For example, the uracil and fatty acid may be added to a heated aromatic hydrocarbon oil and both materials simultaneously dissolves. In another embodiment, the uracil and fatty acid cosolvent may be admixed and the resultant premix added to a heated or unheated oil. For best results, the dissolution of uracil via fatty acid cosolvency effect is best carried out at a temperature of at least 40° C. up to the boiling point of any of the several components.

It is not exactly understood in what manner the fatty acid cosolvent effects dissolution of uracil in aromatic hydrocarbon oil. However, it is believed that the fatty acid acts as b bridging agent due to its balanced hydrophilic-lipophilic ratio to thereby effectuate solution of uracil in aromatic hydrocarbon oil.

Until the present invention, it was impossible to solubilize substituted-uracils in any substantial proportion in hydrocarbon media. Without benefit of a fatty acid cosolvent hydrocarbon solutions containing at least 5 percent uracil herbicide were impossible to achieve. In addition, even with benefit of fatty acid cosolvent 3,5,6-substituted uracils are only difficulty soluble, if at all, in other hydrocarbon oils containing lower amounts of aromatic content. In other cases the uracil, while initially soluble, does not remain so for appreciable durations of time. It is essential, therefore, in the practice of the instant invention that the hydrocarbon-solubilizing agent have an aromatic content of at least 60 percent to obtain a uniform, long-lasting homogeneous solution of uracil via fatty acid cosolvent.

A preferred composition of the invention, composition A below includes the preferred range of parts by weight of the various ingredients which go to make up the novel uracil compositions of the invention.

COMPOSITION A

| Ingredients | Percent by Weight |
| --- | --- |
| Aromatic hydrocarbon oil | 60–94 |
| Fatty acid | 1–20 |
| Uracil | 5–20 |

The most preferred range of ingredients of the herbicidal compositions is shown by the general formula set forth below as composition B.

COMPOSITION B

| Ingredients | Percent by Weight |
| --- | --- |
| Aromatic hydrocarbon oil | 70–94 |
| Fatty acid | 1–15 |
| Uracil | 5–15 |

In following the above steps to produce herbicidally active liquid compositions it is a further practice of the invention, in certain instances, to add to those products other herbicides such as esters of 2,4,5-trichlorophenoxyacetic acid, esters of 2,4-dichlorophenoxyacetic acid, pentachlorophenol, 2,3,6-trichlorobenzoic acid, 2, methyl-4-chlorophenoxyacetic acid and methoxy 2,3,6-trichlorobenzoic acid.

For example, it is often desirable to combine compositions A or B above with various other herbicides in order to both fortify the substituted uracils and/or overcome some of their inherent deficiencies in treating various grasses or broad leaf plants. A few of the suitable combinations of A and B with other herbicides are listed below. Many of these herbicides are nonselective contact killers or sterilants. That is, they destroy or retard the growth of both momocotyledonous and dicotyledonous plant species. Other materials listed are useful in inhibiting the growth of or destroying brush or grasses specifically. In some instances, these herbicides show synergistic activity in promoting the activity of the uracil in addition to exhibiting their own special type of herbicidal activity.

Table I below shows the preferred herbicides which are used to fortify the substituted uracils and their preferred weight composition when combined with compositions A or B to form a unitary herbicidal system.

TABLE I

| Herbicide | % by Weight |
|---|---|
| Esters of 2,4-dichlorophenoxyacetic acid and 2,4,5-trichlorophenoxyacetic acid | 1-5 |
| Pentachlorophenol | 0.5-5 |
| Esters of trichloroacetic acid | 1-5 |
| Methoxy triazines | 1-5 |
| 2,3,6-trichlorobenzoic acid | 1-5 |

Generally, when one or more herbicides are used in addition to the dissolved uracil the following ranges of ingredients are preferred.

| Material | % by Weight |
|---|---|
| Aromatic Oil | 30-89 |
| Uracil | 5-20 |
| Fatty Acid | 1-20 |
| Additional Herbicide(s) | 5-30 |

With specific reference to the above herbicides, many esters of both trichlorophenoxyacetic and dichlorophenoxy acetic acids show herbicidal activity and particular utility in combination with the compositions of the invention. Among the esters of both of these acids are the iso-octyl esters, the propylene glycol-bis esters, propylene glycol butyl ether esters, etc. Lastly, methoxy triazines are useful in the invention, and include 2-methoxy, 4-isopropylamino, 6-isopropylamino triazine; 2-methoxy, 4-methylamino, 6-isopropylamino triazine; 2-methoxy, 4-diethylamino, 6-isopropylamino triazine; and 2-methoxy, 4-ethylamino, 6-ethylamino triazine. Mercapto triazines such as 2-methyl mercapto, 4-ethylamino, 6-ethylamino triazine, etc., are also useful.

The herbicidally active 3,5,6-substituted uracils which form an essential ingredient of the compositions of the invention fall within the following general structural formula:

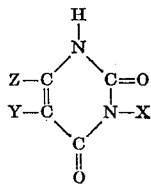

wherein X is a monovalent organic radical selected from the group consisting of hydrogen, alkyl, aralkyl, alkaryl, hydroxyalkyl, thioalkyl, carboxyalkyl, and alkyl ester radicals with the proviso that the radical contain not more than nine carbon atoms. Y and Z are radicals chosen from the group consisting of halogen, nitro, cyano, amino, alkoxyamino, alkyl, alkaryl, aralkyl, phenylamino, aminophenyl and sulfonamide.

The various substituents on the basic uracil ring may be varied over a wide range. That is to say, the radicals attached to the heterocyclic ring generally represented by X, Y, and Z may contain a wide spectrum of functional organic groups. Among these, a few are listed in table II below.

TABLE II

X
1. $H, CH_3, C_2H_5, CH(CH_3)_2$
2. $CH_2C_6H_5$, $CH_2$-⟨phenyl⟩-R
3. $CH_2OH, CH_2CH_2OH$
4. $CH_2SH, CH_2CH_2SH$
5. $CH_2COOH$
6. $CH_2COOC_2H_5$ Y
1. Cl, Br, I
2. $NO_2$, C≡N
3. $NH_2$, NH(OCH)
4. $CH_2C_6H_5, CH_3$
5. ⟨phenyl⟩-NH
6. $H_2N$-⟨phenyl⟩-$SO_2NH$ Z
1. Cl, Br, I
2. $CH_3, C_2H_5$, Cyclohexyl
3. $NH_2$, NH(OCH)
4. $H_3C$-⟨phenyl⟩-NH, $C_6H_5CH$ Other herbicidally active 3,5,6-substituted uracils are shown in Belgian Pat. No. 625,897 the disclosure of which is incorporated herein by reference.

Specific uracil compounds which have found particular use in the practices of the invention are listed below in table III wherein the particular substituents as expressed by X, Y, Z, comprising the particular compounds are listed.

TABLE III

| Composition No.: | X | Y | Z |
|---|---|---|---|
| 1 | $(CH_3)_2CH$ | Br | $CH_3$ |
| 2 | $CH_3$ | Cl | Cl |
| 3 | H | Br | $CH_3$ |
| 4 | $CH_3$-⟨phenyl⟩ | Br | $CH_3$ |
| 5 | $CH_2CH_2OH$ | Br | $CH_3$ |
| 6 | $CH_2SH$ | I | $CH_2CH_3$ |
| 7 | $CH_2C=O-OH$ | $CH_3$ | Br |
| 8 | ⟨phenyl⟩-NH | $CH_3$ | Br |
| 9 | $(CH_3)_2CH$ | $H_2N$-⟨phenyl⟩-$SO_2NH$ | Br |
| 10 | $C_6H_{11}$ a | Br | $CH_3$ |
| 11 | ⟨phenyl⟩-$CH_2CH_2$ | Br | $CH_3$ |
| 12 | $CH_3$ | Br | $C_6H_{11}$ a |
| 13 | $(CH_3)_2CH$ | C≡N | $CH_3$ |
| 14 | $(CH_3)_2CH_2CH$ | | | a Cyclohexyl.

As has been discussed above, the herbicidally active uracils of the above type listed materials are solubilized in a phytotoxic hydrocarbon oil through the use of fatty acids which will be discussed in more detail below. The oil itself in the composition helps to give extremely fast herbicidal control by searing or burning the undesirable vegetation upon immediate contact. In particular, it has been found that those hydrocarbon oils that should be used to both provide highly concentrated stable uracil solutions and finished herbicidal compositions which are effective in controlling a wide spectrum of annual or perennial broad leaf plants and/or grasses, are those hydrocarbon oils which may be generically classified as "aromatic petroleum hydrocarbon solvents." Specifically, this type solvent includes those particular petroleum-type solvents which contain at least 60 percent by weight of aromatic components and more preferably, 65 percent by weight or more. Most preferably, the hydrocarbon oil solvent should have an aromatic content of 70–95 percent.

Exemplary solvents of this type are listed in table IV as follows. For convenience, the specifications of these typical industrial aromatic type oils are included. These oils are all extremely economical to use and would add little or no cost to the composition employing same.

TABLE IV

| Specifications | A | B | C | D | E |
|---|---|---|---|---|---|
| Specific gravity at 60° F | 0.931 | 0.947 | 0.935 | 0.934 | 0.9279 |
| Flash point PMCC (° F.) | 210 | 250 | 175 | 200 | |
| Aromatic content | 83 | 70 | 90 | 65 | 85 |
| Color ASTM | 5.0 | Green | | | (1) |
| Aniline point, ° F | (2) | 88 | (3) | | 78 |
| Sulfur (percent) | 0.7 | | 0.09 | | |
| Viscosity S.U. at 100° F. | | 42 | | 36 | |
| ASTM distillation | | | | | |
| I.B.P. ° F | 430 | 488 | 345 | 460 | 340 |
| Percent recovered: | | | | | |
| 10 | 445 | | | 470 | 363 |
| 50 | 463 | | 440 | 510 | 446 |
| 90 | 497 | | 488 | | 500 |
| End point | 540 | 748 | | 730 | 532 |
| Pentachlorophenol solution at 40° F | 15.0 | 12.5 | 15.0 | 15.0 | |

1 Pale amber.
2 Mixed 26° F.
3 Mixed 66° F.
NOTE.—Desired specifications:
Specific gravity at 60° F.—1.00 or slightly lower.
Flash point PMCC—225° F. or lower.
Aromatics—maximum amount—at least 60%.
Olefins—minimum amount.
Viscosity S.U.S. at 100° F.—30–40.
Odor—sweet.
Pour point—0° F. or lower (no sludging or pronounced thickening down to 32° F.).

With respect to the fatty acid cosolvent preferred materials contain at least four carbon atoms. The most preferred cosolvents are the well-known unsaturated aliphatic fatty acids which contain at least 12 carbon atoms in an aliphatic chain. Exemplary of such materials are listed below:

| | |
|---|---|
| Lauroleic | Linoleic |
| Myristoleic | Linolenic |
| Palmitoleic | Eleosteric |
| Oleic | Licanic |
| Gadoleic | Arachidonic |
| Erucic | Clupanodonic |
| Ricinoleic | |

Among other sources of fatty acids may be mentioned heptylic acid, capric acid, pimelic acid, sebacic acid, diricinoleic acid, triricinoleic acid, polyricinoleic acid, ricinostearolic acid, ricinoleyl lactic acid, acetylricinoleic acid, chloracetylricinoleic acid, lauric acid, myristic acid, undecylenic acid, palmitic acid, mixtures of any two or more of the above-mentioned acids or other fatty acids, mixed higher fatty acids derived from animal or vegetable sources, for example, lard, coconut oil, tall oil, rapeseed oil, sesame oil, palm kernel oil, palm oil, olive oil, corn oil, cottonseed oil, sardine oil, tallow, soybean oil, peanut oil, castor oil, seal oil, whale oil, shark oil and other fish oils, teaseed oil, partially or completely hydrogenated animal and vegetable oils, such as those mentioned; hydroxy and alpha-hydroxy fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy coconut oil mixed fatty acids, alphahydroxymargaric acid, alphahydroxy arachidic acid, and the like; fatty acids derived from various waxes, such as beeswax, spermaceti, montan wax, Japan wax, cocerin, and carnauba wax. Such acids include carnaubic acid, cerotic acid, lacceric acid, montanic acid, psyllastearic acid, etc.

Utilizing the chemicals described above there is listed below a typical composition of the invention:

COMPOSITION C

| Constituent | % by Weight |
|---|---|
| 3-sec butyl-5-bromo, 6-methyl uracil | 10.0 |
| Tall oil fatty acid | 10.0 |
| Oil C of Table III | 80.0 |

To the basic compositions of the invention may be added various other ingredients. A typical composition containing added active ingredients used to fortify the oil-solubilized substituted uracil compounds is as follows:

COMPOSITION D

| Constituent | % by Weight |
|---|---|
| 3-sec butyl, 5-bromo, 6-methyl uracil | 10.0 |
| Tall oil fatty acid | 10.0 |
| Oil C of Table III | 61.5 |
| Isoctyl ester of 2,4-dichlorophenoxyacetic acid | 10.0 |
| Pentachlorophenol | 8.5 |

Since in many cases the uracil hydrocarbon concentrates are to be stored for considerable lengths of time prior to actual use, a simple storage stability test was run with respect to composition C. In this test, the materials were subjected to shelf storage for a period of 3 months. Visual inspection of the sample after this time showed that the material was still homogeneous in character without phase separation or precipitation of any type.

In another series of tests, the above-described uracil oil concentrate was diluted and tested for its herbicidal activity upon a predetermined test plot.

In a comparative test, fresh uracil in form of dust was also employed in equal active concentrations expressed in pounds per acre. It was noted that the hydrocarbon oil solution exhibited as much long-duration kill activity as did the unformulated uracil sample. This is proof of the contention that uracil herbicidal activity is not lost through solution in aromatic hydrocarbon oil via cosolvency effect of the fatty acid. In addition, the hydrocarbon oil composition of the invention containing uracil gave immediate contact kill due to presence of phytotoxic hydrocarbon oil. The uracil applied in dust form gave substantially no immediate kill results.

In another series of comparative runs, the concentrates of the invention were further diluted with additional oil, and applied to broad leaf and grass sites in active uracil concentrations ranging from about 0.5 to about 1.0 percent by weight. Aqueous suspensions of the same uracil, and in the same dosages, exhibited poor results with respect to visual kill of broad leaf and grass test samples. In some instances, via visual readings of the hydrocarbon-based uracil sample results vs. results with aqueous suspensions of uracil demonstrated that the former solutions were manifold times greater in effectiveness. Thus, two important advantages of the invention have been realized by application of a unitary uracil hydrocarbon composition; namely, both immediate contact kill as well as long term duration residual kill and growth inhibition are exhibited. Such aims can best be accomplished by synthesis and use of a homogeneous solution of uracil in a phytotoxic hydrocarbon oil having an aromatic hydrocarbon of at least 60 percent.

In another test series, sole application of a hydrocarbon oil was completely ineffectual with regard to preemergence effect; that is, application of hydrocarbon oil of the type listed above had no effect whatsoever upon seed germination. On the other hand, the compositions of the invention comprising both uracil and phytotoxic hydrocarbon oil had an excellent preemergence effect upon a variety of plants to the point where almost complete kill was shown even at the end of the testing period. As well, such compositions exhibited excellent initial postemergence effectiveness or weed control activity upon visible growth. Thus, only through solubilization or uracil via the novel solvent system discussed above can a substituted uracil be uniformly applied such as by spraying in presence of a hydrocarbon oil to give an acceptable contact kill in addition to a long term lasting effect. After the initial destruction or inhibition of growth has taken place through the medium of the phytotoxic oil, a continued killing effect is primarily derived from the reactivity of the uracil and other herbicidal ingredients of the compositions of the invention. The contact kill effect of the oil in essence enhances the overall action of the active herbicide ingredients in destroying, retarding or preventing regrowths of vegetation.

Where a water-based product is desired, or an oil-in-water or water-in-oil emulsion, it is helpful to blend the above hydrophobic-type oil compositions with water and an oil and/or water dispersible wetting agent, such as described in the article entitled "Synthetic Detergents-Up-To-Date" by John W. McCutcheon, Soap and Sanitary Chemicals, July-Oct. 1952. These wetting and dispersing agents can be added to the herbicidal compositions of the type described herein in order to enhance the wetting effect and produce better dispersion of the active herbicidal material on the vegetation to which it is applied. It will be understood, however, that such auxiliary agents are not necessary and can be omitted in the practical application of the invention.

It is obvious that various ramifications and modifications of the instant invention can be made in the light of the instant disclosure.

What is claimed is:

1. A quick acting liquid herbicidal composition comprising about 61.5 percent by weight of a hydrocarbon oil having an aromatic content of about 90 percent, about 10 percent by weight of 3-sec butyl, 5-bromo, 6-methyl uracil dissolved therein by means of about 10 percent by weight of a fatty acid cosolvent having at least 12 carbon atoms in chain length, 10 percent by weight of the isooctyl ester of 2.4-dichlorophenoxy acetic acid, and about 8.5 percent by weight of pentachlorophenol.

2. A quick acting liquid herbicidal composition comprising a major amount of a hydrocarbon oil having an aromatic content of at least 60 percent and a herbicidally active 3-sec butyl, 5-bromo, 6-methyl uracil dissolved therein by means of a fatty acid cosolvent having at least 12 carbon atoms in chain length.

3. A quick acting liquid herbicidal composition comprising 30–89 percent of a hydrocarbon oil having an aromatic content of at least 60 percent, 5–20 percent of a herbicidally active 3-sec butyl, 5-bromo, 6-methyl uracil dissolved therein by means of 1–20 percent by weight of a fatty acid cosolvent having at least 12 carbon atoms in chain length and 5–30 percent by weight of at least one additional herbicidal composition other than said uracil.

* * * * *

PO-1050
(5/69)

UNITED STATES PATENT OFFICE
CERTIFICATE OF CORRECTION

Patent No. 3,628,942           Dated December 21, 1971

Inventor(s) Joseph F. Vartiak

It is certified that error appears in the above-identified patent and that said Letters Patent are hereby corrected as shown below:

Column 1, line 15, delete "so".

Column 2, line 4, "dissolves" should read -- dissolved --; line 12, "b" should read -- a --.

Column 4, line 18, "CH-R" should read -- CH₂-R --;

line 28, "C⁻ N" should read -- C≡N --; line 38, "cl" should read -- Cl --.

Signed and sealed this 6th day of June 1972.

(SEAL)
Attest:

EDWARD M. FLETCHER, JR.         ROBERT GOTTSCHALK
Attesting Officer                 Commissioner of Patents